3,170,812
METHOD OF VITRIFYING CERAMIC COATINGS
Murray A. Schwartz, Dayton, Ohio, assignor to the United States of America as represented by the United States Atomic Energy Commission
No Drawing. Filed Sept. 30, 1953, Ser. No. 383,422
2 Claims. (Cl. 117—93.2)

My invention relates to a method of vitrifying ceramic coatings on ceramic bodies and particularly on beryllium carbide-carbon bodies.

In addition to numerous other high temperature uses, beryllium carbide-carbon bodies, particularly $Be_2C$ bodies containing approximately 10% to approximately 30%, free carbon, by weight, may be employed as a nuclear reactor core material. However, the chemical and physical properties of $Be_2C$—C are such that a protective coating is definitely needed, especially as a protection against oxidation.

Many methods have previously been employed for applying ceramic coatings to beryllium carbide-carbon bodies. One commonly employed method involved mixing and fritting the batch components of the coating, grinding the resulting frit to a desired particle size, placing the ground frit into an aqueous suspension and applying the suspension on the $Be_2C$—C body by dipping, painting or spraying. The resulting coating was then usually vitrified (that is converted from a heterogeneous, soft and opaque layer to a homogeneous, hard and glassy layer) by firing in a gas kiln in an atmosphere of combustion products or in Globar or carbon tube resistor furnaces in air.

However, these and other prior methods often resulted in devitrified, crystalline, powdery coatings at high firing temperatures and in only partially vitrified coatings at low firing temperatures. The coatings thus obtained were incapable of protecting the underbodies from severe chemical and physical attack at high operating temperatures, resulting in erosion and/or oxidation of the underbody. Furthermore, in neutronic reactors, wherein fissionable fuel may be disposed within the beryllium carbide matrix, loss of precious fuel and escape of dangerous fission products may occur.

Accordingly, an object of my present invention is to provide an improved method of vitrifying a ceramic coating on a beryllium carbide-carbon body.

Another object is to provide a method of vitrifying a ceramic coating on a beryllium carbide-carbon body which will be capable of protecting same from severe chemical and physical attack at high temperatures.

Another object is to provide a method of vitrifying a ceramic coating on a beryllium carbide-carbon body which will be adherent, non-flaky and chemically stable toward the underbody at high temperatures.

Additional objects and advantages of my invention will be apparent from the following description and the claims appended hereto.

In accordance with my present invention, herein disclosed is an improved method of vitrifying a ceramic coating on a beryllium carbide-carbon body which comprises heating said body by radiant heating means until said coating is partially vitrified and subsequently heating the resulting body by induction heating means at a suitable higher temperature until said coating is completely vitrified.

The use of my method results in the formation of an unexpectedly superior, adherent and uniform coating on a $Be_2C$—C body, which is capable of protecting same from severe chemical and physical attack at elevated temperatures. The coating is chemically stable toward the underbody, will not crack under repeated thermal shock cycles (rapid heating followed by rapid cooling), and shows little tendency towards erosion when subjected to the action of high-velocity and high-temperature gases.

The reaction mechanism of my two-step firing method is not fully understood. Apparently, the radiant heat energy heats the coating relatively faster than the underbody, while the induction heat energy heats the underbody as rapidly as the coating since $Be_2C$—C becomes a susceptor at sufficiently elevated temperatures. Evidently, heating both coating and underbody simultaneously in the second firing after the coating has been partially vitrified in the first firing unpredictably improves the bonding therebetween.

I find that other firing sequences produce inferior coatings. Thus, in employing solely induction heating means, such as may be obtained with an induction-type furnace, at vitrification temperatures in a one-step firing procedure, the underbody is heated at least as rapidly as the coating and is attacked by whatever atmosphere is employed before the coating composition can be melted to protect it.

Similarly, in employing solely radiant heating means, such as may be obtained with a resistance-type furnace, at vitrification temperatures in a one-step firing procedure, the body is heated unevenly, the coating receiving irradiated and convected heat before the underbody, and relatively poor adhesion between underbody and coating occurs.

Finally, when the firing procedure is reversed, that is, a first firing in an induction-type furnace at a relatively low temperature followed by a second firing in a resistance-type furnace at a higher temperature, poor coatings are likewise obtained.

In the first step of my two-step firing technique, whereing the coated body is heated by radiant heating means, it is preferred to employ a temperature sufficient to rapidly melt lower-melting components of the coating material. Consequently, the coating material becomes semi-fluid, spreads uniformly over the beryllium carbide underbody and protects the latter from decomposition during further heat treatment. The partially vitrified coating may then be heated by induction heating means to a temperature at which the higher melting components of the coating become fluid and maintained at that temperature until the vitrification of the coating is completed.

While satisfactory coatings may be achieved by applying induction heat to the partially vitrified coating immediately after the initial radiant heating period, surprisingly better results may be achieved by first rapidly cooling the coated body. For example, the coated body may be removed from the resistance furnace, placed upon a water-cooled plate and permitted to cool to the ambient atmospheric temperature. While this treatment subjects both the beryllium carbide-carbon underbody and the ceramic coating to thermal shock, it is nevertheless beneficial, since it exerts a quenching effect on the glass coating. Devitrification of the coating, which tends to occur with the slower cooling, is thereby also suppressed. Rapid cooling of the coated body does not appear to be beneficial upon completion of the second firing, and it is therefore preferred to permit the resulting coated body to slowly cool to the ambient atmospheric temperature.

Exact firing temperatures and schedules are not critical and may depend upon the particular ceramic coating and body employed. My method may be very suitably employed with coatings whose major components are silica, alumina and lime, while particularly satisfactory results may be obtained by employing the coatings disclosed and claimed in co-pending application S.N. 383,421, entitled "Composition and Method for Coating a Ceramic Body," field September 30, 1953, in the name of M. K. Blanchard.

As disclosed in that application, suitable coatings comprise approximately 1.5–3.5 moles of an acidic oxide, approximately 0.1–0.6 mole of an amphoteric oxide and approximately 0.8–2.4 moles of a basic oxide. The batch composition of these coatings generally comprise approximately: 30% to 70% $SiO_2$, 3% to 17% $Al_2O_3$, 5% to 14% $Na_2O$, 2% to 7% $Li_2O$, 1% to 5% BaO, 3% to 15% $TiO_2$ and 10% to 46% CaO. Satisfactory firing schedules for these coatings are found in the ranges: approximately 2400° F.–2750° F. for approximately 15–30 minutes in a resistance-type furnace, followed by approximately 2750° F.–2950° F. for approximately 20–40 minutes in an induction-type furnace, while a preferred firing schedule is approximately 2650° F. for approximately 25 minutes in a resistance-type furnace, followed by approximately 2850° F. for approximately 30 minutes in an induction-type furnace.

A high quality coating may be obtained on $Be_2C$—C by employing my firing technique in an oxidizing atmosphere, and still better coatings may be had in a non-oxidizing or inert atmosphere, while operation in a reducing (e.g., hydrogenous) atmosphere is preferred, giving unexpectedly superior coatings.

The following example will illustrate my invention in greater detail.

*Example*

A beryllium carbide-carbon body, 1″ x 1″ x 1¼″, containing 10% carbon as free graphite was sprayed with an aqueous suspension of fritted refractory oxides of the following compositions: $SiO_2$, 50.2%; $TiO_2$, 6.8%; $Li_2O$, 4.4%; BaO, 2.8%; $Na_2O$, 10.6%; $Al_2O_3$, 5.0%; and CaO, 20.2%. The resulting wet-coated beryllium carbide body was dried and placed in a molybdenum (wire-wound) resistance furnace having a hydrogen atmosphere and maintained at a temperature of 2650° F. (as determined by a thermocouple). After heating at the latter temperature for a period of 30 minutes the resulting coated beryllium carbide-carbon body was withdrawn from the furnace, placed upon a water-cooled plate, and quickly cooled to the ambient atmospheric temperature. The coated beryllium carbide-carbon body was then placed in an induction-furnace, and heated at a temperature of 2850° F. (as determined by an optical pyrometer) for a period of 30 minutes at the end of which time the body, having a vitrified coating bonded thereto, was removed from the furnace and permitted to cool to the ambient atmospheric temperature.

This procedure resulted in the formation of a completely vitrified coating on the $Be_2C$—C body. The adherence of the coating to the underbody was excellent. Coverage of the underbody, including fairly sharp edges and corners, was very uniform. Upon microscopic examination, the thickness of the fired coatings was observed to be only about 0.001 inch. Oxidation-resistance testing was done by placing the specimen in a platinum-wound furnace and subjecting it to a high-velocity stream of air at a temperature of 2500° F. After 250 hours, the sample had gained but a few milligrams in weight, signifying excellent oxidation resistance. Upon completion of the oxidation test, the coated sample was cross sectioned with a diamond cut-off wheel. Microscopic examination of the cross section indicated excellent adherence between coating and underbody, little or no reaction between coating and underbody, and little or no devitrification in the glaze.

It should be understood that the above example is merely illustrative and that those skilled in the art may make various modifications without departing from the spirit of my invention. For example, it will be apparent to one skilled in the art that my two-step firing method may be advantageously utilized in vitrifying ceramic coatings on ceramic bodies other than $Be_2C$—C, the only apparent requirements being that the coating and underbody are chemically compatible and that the ceramic body be a susceptor. Therefore, my invention should be understood to be limited only as is indicated by the appended claims.

Having thus described my invention, I claim the following to be inventive:

1. An improved method of providing a protective coating on a beryllium carbide-carbon body, which comprises applying on said body a ceramic coating comprising approximately 1.5–3.5 moles of an acidic oxide, approximately 0.1–0.6 mole of an amphoteric oxide and approximately 0.8–2.4 moles of a basic oxide, wherein the major acidic oxide component is $SiO_2$, the major amphoteric oxide component is $Al_2O_3$ and the major basic oxide component is CaO, heating the resulting coated body by radiant heating means in a non-oxidizing atmosphere until a portion of said coating is melted, said melted portion being sufficient to cover the surface of said body and subsequently heating the resulting coated body by induction heating means in a non-oxidizing atmosphere at a sufficiently higher temperature to effect complete vitrification.

2. An improved method of providing a protective coating on a beryllium carbide body containing approximately 10% to 30% carbon, by weight, which comprises fritting a mixture comprising approximately 30% to 70% $SiO_2$, 3% to 17% $Al_2O_3$, 5% to 14% $Na_2O$, 2% to 7% $Li_2O$, 1% to 5% BaO, 3% to 15% $TiO_2$ and 10% to 46% CaO, forming an aqueous suspension of the resulting mixture, applying the resulting suspension on said body, heating the resulting coated body by radiant heating means in a hydrogen atmosphere at a temperature of approximately 2400° F.–2750° F. for approximately 15–30 minutes, cooling the resulting body to substantially the ambient atmospheric temperature, and heating the resulting cooled body by induction heating means in a hydrogen atmosphere at a temperature of approximately 2750° F.–2950° F. for approximately 20–40 minutes.

References Cited by the Examiner

UNITED STATES PATENTS

| | | | |
|---|---|---|---|
| Re. 17,661 | 5/30 | Martin | 117—125 |
| 2,353,165 | 7/44 | Kreidl et al. | 117—125 XR |
| 2,385,567 | 9/45 | Descarsin | 219—10.41 XR |
| 2,389,386 | 11/45 | Russell | 117—125 |
| 2,448,009 | 8/48 | Baker | 117—103 XR |
| 2,452,197 | 10/48 | Kennedy | 117—103 XR |
| 2,463,054 | 3/49 | Quayle et al. | 117—103 XR |
| 2,473,539 | 6/49 | Merriam | 117—103 XR |
| 2,579,050 | 12/51 | Ramsay | 117—125 XR |
| 2,663,658 | 12/53 | Schurect | 117—103 XR |

RICHARD D. NEVIUS, *Primary Examiner.*

R. Z. CAMPBELL, WILLIAM G. WILES, *Examiners.*